(12) United States Patent
Tran et al.

(10) Patent No.: US 8,565,198 B1
(45) Date of Patent: *Oct. 22, 2013

(54) SYSTEMS AND METHODS FOR CONTROLLING THE TRANSMISSION AND RECEPTION OF PACKETS OVER A COMMON ANTENNA

(75) Inventors: Ninh Tran, San Francisco, CA (US); Timothy Li, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 98 days.

This patent is subject to a terminal disclaimer.

(21) Appl. No.: 13/269,112

(22) Filed: Oct. 7, 2011

Related U.S. Application Data

(63) Continuation of application No. 12/330,927, filed on Dec. 9, 2008, now Pat. No. 8,036,170.

(60) Provisional application No. 61/016,710, filed on Dec. 26, 2007.

(51) Int. Cl.
*H04W 4/00* (2009.01)
*H04J 3/00* (2006.01)
*H04B 7/00* (2006.01)

(52) U.S. Cl.
USPC .......... 370/336; 370/329; 370/345; 455/41.2; 455/509; 725/98

(58) Field of Classification Search
USPC ............. 370/232–345; 455/41.2, 63.3, 414.3, 455/450, 552.1, 509, 556.1; 725/62–98; 375/132, 135, 260
See application file for complete search history.

(56) References Cited

U.S. PATENT DOCUMENTS

| 7,292,617 | B2 * | 11/2007 | Beasley et al. | 375/132 |
| 2007/0167147 | A1 * | 7/2007 | Krasner et al. | 455/404.2 |
| 2009/0144509 | A1 * | 6/2009 | Wong et al. | 711/147 |
| 2009/0286504 | A1 * | 11/2009 | Krasner et al. | 455/404.1 |

* cited by examiner

*Primary Examiner* — Afsar M Qureshi

(57) ABSTRACT

A system including i) first wireless communication circuitry to receive and transmit packets of a first type via an antenna, and ii) second wireless communication circuitry to receive and transmit packets of a second type via the antenna. The packets of the second type are transmitted and received during time slots having a predefined length, and the time slots are separated by time intervals during which no packets of the second type are transmitted or received by the second wireless communication circuitry. The system further includes an arbiter to control access of the first wireless communication circuitry and the second wireless communication circuitry to the antenna, wherein the arbiter causes the packets of the first type to be transmitted and received by the first wireless communication circuitry during the time intervals during which no packets of the second type are transmitted or received by the second wireless communication circuitry.

13 Claims, 8 Drawing Sheets

SYSTEMS AND METHODS FOR CONTROLLING THE TRANSMISSION AND RECEPTION OF PACKETS OVER A COMMON ANTENNA

CROSS-REFERENCE TO RELATED APPLICATIONS

This present disclosure is a continuation of U.S. application Ser. No. 12/330,927, filed on Dec. 9, 2008, which claims priority under 35 U.S.C. §119(e) to U.S. Provisional Application No. 61/016,710, filed on Dec. 26, 2007.

FIELD

The technology described in this patent document relates generally to wireless communication circuitry. More specifically, systems and methods are provided for controlling the transmission and reception of packets over a common antenna—e.g., a single antenna.

BACKGROUND

With an increasing demand for wireless-enabled electronic devices, it is not uncommon for an electronic device to be equipped with multiple types of wireless communication circuitries. In many applications, various types of wireless communication circuitries are required to share a common antenna—e.g., a single antenna. In this situation it is often necessary to control access to the shared antenna to prevent interference, particularly when the wireless communication circuitries operate in the same or close frequency bands. For example, many devices share a single antenna for both IEEE 802.11 WLAN (WiFi) and Bluetooth™ communications, both of which operate in the unlicensed 2.4 GHz band. To prevent interference between WLAN and Bluetooth™ signals, antenna priority is typically given to the WLAN signal. However, this may cause interruptions in Bluetooth™ service, particularly when streaming data such as Bluetooth™ A2DP audio transmissions.

SUMMARY

In accordance with the teachings described herein, systems and methods are provided for controlling the transmission and reception of WLAN and short range wireless signals over a single antenna. WLAN communication circuitry may be used to generate data packets for wireless transmission via the antenna and to process data packets received via the antenna. Short range wireless communication circuitry may be used to receive and transmit audio packets via the antenna. Front end connection and logic circuitry may be used to route the data packets and audio packets for wireless transmission and reception via the antenna. The audio packets are transmitted and received during time slots that are separated by predefined time intervals during which no audio packets are transmitted or received by the short range wireless communication circuitry. An arbiter may be used to control access to the antenna by the WLAN communication circuitry and short range wireless communication circuitry. The arbiter may cause the data packets to be transmitted and received by the WLAN communication circuitry during the time intervals during which no audio packets are transmitted or received by the short range wireless communication circuitry. The length of the time intervals may be calculated to maximize a throughput of the data packets and to maintain a desired throughput of the audio packets.

The WLAN communication circuitry and the short range wireless communication circuitry may operate in the same frequency band. In one example, the audio packets transmitted and received by the short range communication circuitry may be compliant with revision V1.2 of the Advanced Audio Distribution Profile (A2DP) Bluetooth™ standard. The WLAN communication circuitry may be compliant with the one or more of the IEEE 802.11b, 802.11g and 802.11n standards.

In one embodiment, the audio packets are transmitted using a Bluetooth™ 5+1 five slot 3-DH5 packet format. Following this a one slot acknowledgement packet is received. In addition, multiple audio packets may be transmitted with acknowledgement packets received using a preselected number of back-to-back time slots. The preselected number of back-to-back time slots may be selected to maximize the throughput of the data packets and to maintain the desired throughput of the audio packets.

A method of controlling access to a single antenna by WLAN communication circuitry and short range wireless communication circuitry may include the following steps: providing access to the single antenna by the short range wireless communication circuitry to transmit or receive audio packets during time slots that are separated by time intervals during which no audio packets are transmitted or received by the short range wireless communication circuitry, the time intervals having a predefined length; and providing access to the WLAN communication circuitry to transmit or receive data packets during the time intervals during which no audio packets are transmitted or received by the short range wireless communication circuitry.

One example system may include an antenna for sending and receiving radio frequency (RF) signals; means for generating data packets for wireless transmission via the antenna and to process data packets received via the antenna; means for receiving and transmitting audio packets via the antenna, the audio packets being transmitted and received during time slots that are separated by time intervals during which no audio packets are transmitted or received, the time intervals having a predefined length; and an arbiter configured to control access to the antenna, the arbiter causing the data packets to be transmitted and received during the time intervals during which no audio packets are transmitted or received.

DETAILED DESCRIPTION

Figure 1:
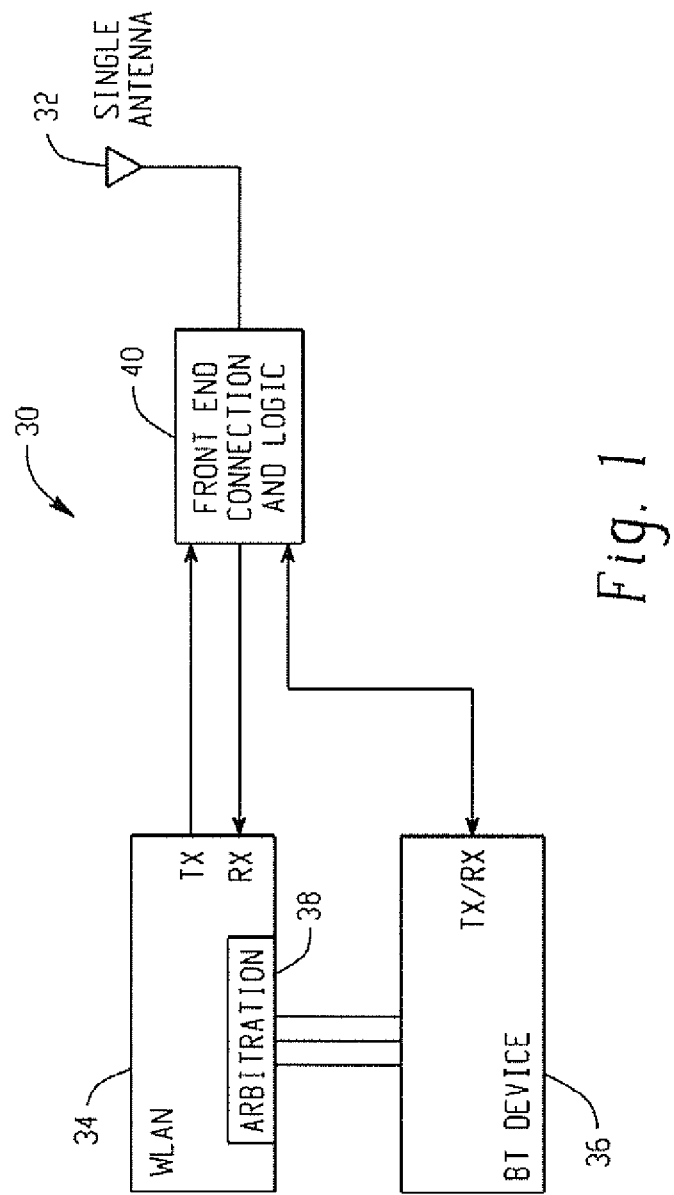
FIG. 1 is a block diagram of an example communication system for controlling the transmission and reception of WLAN and short range wireless packets over a single antenna.

FIG. 1 is a block diagram of an example communication system 30 for controlling the transmission and reception of WLAN and short range wireless packets over a single antenna: The communication system 30 includes an antenna 32, wireless local area network (WLAN) communication circuitry 34, short range wireless communication circuitry 36, an arbitrator 38, and front end connection and logic circuitry 40. The WLAN communication circuitry 34 is configured to generate data packets for wireless transmission via the antenna 32 and to process data packets received via the antenna 32. The WLAN communication circuitry 34 may, for example, generate and process TCP transactions for an IEEE 802.11 compliant WLAN. The short range wireless communication circuitry 36 is configured to transmit and/or receive audio packets via the antenna 32. The short range wireless communication circuitry 36 may, for example, be a Bluetooth™ device that transmits and receives packets of compressed audio information in accordance with the Advanced Audio Distribution Profile (A2DP) Bluetooth™ standard. The front end connection logic circuitry 40 routes packets to/from the antenna 32 and each of the WLAN communication circuitry 34 and the short range wireless communication circuitry 36.

In one implementation, the arbiter 38 controls access to the antenna 32 so that only one of the WLAN communication circuitry 34 or the short range wireless communication circuitry 36 has access to the antenna 32 at a time. This is particularly important when the WLAN communication circuitry 34 and the short range wireless communication circuitry 36 operate in the same frequency band, such as an IEEE 802.11 WLAN (WiFi) and a Bluetooth™ compliant device which both operate in the unlicensed 2.4 GHz band.

Figure 2:
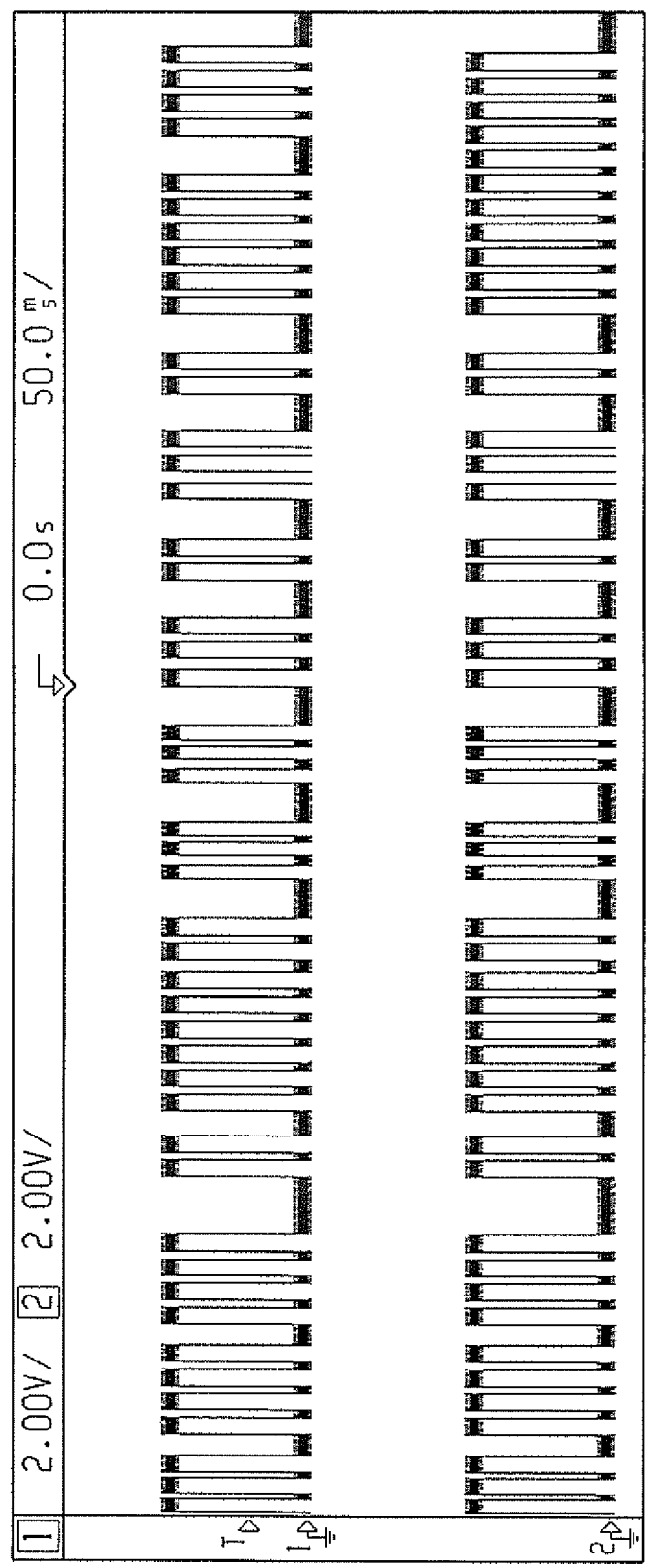
FIG. 2 is an example of Bluetooth™ A2DP stereo audio packet activity.

An example of typical Bluetooth™ A2DP stereo audio packets are illustrated in FIG. 2. In order to provide continuous audio, a Bluetooth™ device typically attempts to transmit the A2DP audio packets without pausing until an audio buffer in the receiver is filled. When the audio buffer is filled, transmission of the A2DP audio packets is typically paused for short time intervals until additional audio data is needed by the buffer. However, as illustrated in FIG. 2, this approach typically requires the Bluetooth™ device to access the antenna for long periods of time with only short intervals between transmissions, preventing the WLAN communication circuitry 34 from accessing the antenna 32. To address this problem, the arbiter 38 gives antenna priority to the audio packets from the short range wireless communication circuitry 36 and causes the audio packets to be transmitted during time slots that are separated by time intervals (i.e., gaps) having predefined lengths. The WLAN communication circuitry 34 is given access to the antenna 32 during time intervals between transmission of audio packets. In this way, the throughput of the WLAN data packets may be maximized, while maintaining a desired throughput for the short range audio packets.

Figures 3, 4, 5:
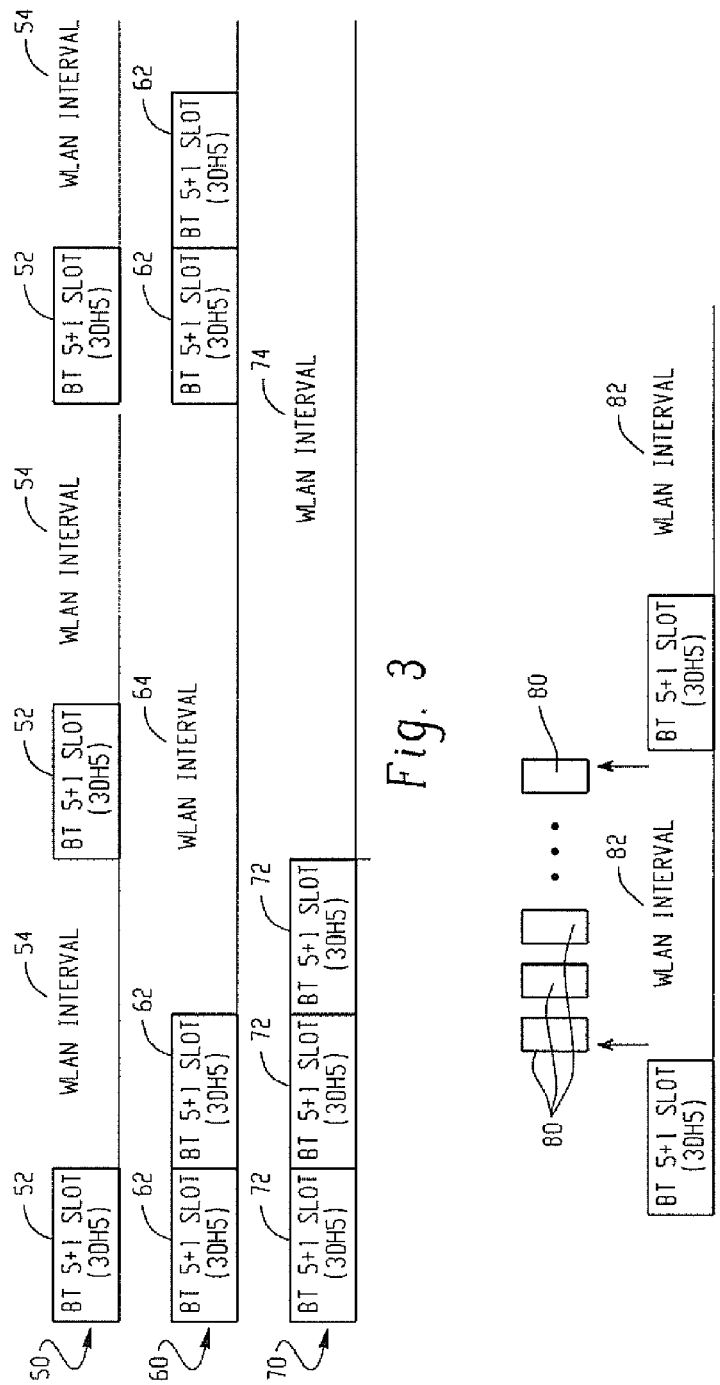
FIG. 3 illustrates example timing diagrams for sharing antenna access between WLAN and Bluetooth™ communication circuitry.
FIG. 4 illustrates WLAN throughput between time slots of Bluetooth™ frames.
FIG. 5 is an example of a standard transmission control protocol (TCP) transaction.

FIG. 3 illustrates example timing diagrams for sharing antenna access between WLAN and Bluetooth™ communication circuitry. The illustrated examples utilize a five slot transmission immediately followed by a one slot acknowledgement (referred to herein as a "5+1 slot") for transmitting Bluetooth™ signals. A single Bluetooth™ slot is 625 μs, and a Bluetooth™ frame may be transmitted over one, three or five 625 μs time-slots. As understood by persons skilled in the art, a 5+1 multi-slot packet format utilizes five-slot packets to provide greater throughput compared to a single 625 μs slot. The Bluetooth™ packet size in the illustrated examples are 3-DH5, which means that each packet has a gross air rate of 3.0 Mbps and occupies five 625 μs time-slots. It should be understood, however, that other slot packet formats and/or packet sizes could be used in other examples.

FIG. 3 illustrates three example timing configurations, respectively designated by reference numbers 50, 60 and 70. In each example timing configuration, groups of one or more Bluetooth™ slots 52, 62, 72 are separated by time intervals 54, 64, 74 for transmitting or receiving WLAN signals. Specifically, in the first example timing configuration 50, each single 5+1 Bluetooth™ slot 52 is followed by a WLAN time interval 54. In the second and third examples 60, 70, back-to-back Bluetooth™ slots 62, 72 are separated by longer WLAN time intervals 64, 74.

The transmission of back-to-back Bluetooth™ slots, as shown in examples 60 and 70, allows for a longer WLAN time interval which increases WLAN throughput. However, if the WLAN time interval is made too large, then there will not be enough throughput of the Bluetooth™ audio packets to satisfy the requirements of the receiver buffer. Accordingly, the choice of how many Bluetooth™ slots are transmitted back-to-back and the length of the WLAN time intervals should be selected to maximize the throughput of the WLAN transmissions while maintaining sufficient throughput of the Bluetooth™ audio packets to satisfy the requirements of the receiver buffer for providing continuous audio. Moreover, WLAN time intervals should be selected in integral amounts of Bluetooth™ slots so as to not disturb the Bluetooth™ timing.

As illustrated in FIG. 4, the potential WLAN throughput is constrained by the number of TCP transactions 80 that may be performed during the WLAN time intervals 82. An example of a standard TCP transaction is shown in FIG. 5. The amount of time necessary to perform a TCP transaction, and thus the number of TCP transactions that may fit within the WLAN time interval 82, is dependent on the characteristics of the WLAN. As an example, following are examples of time domain calculations for one TCP transaction within two WLANs having different network characteristics. The first example shows time domain calculations for a TCP transaction in an 801.11 g WLAN with a 54 Mbps data rate, and the second example shows time domain calculations for the same TCP transaction in an 802.11b WLAN with a 11 Mbps data rate.

EXAMPLE 1

IEEE 802.11g @ 54 Mbps

DIFS: 34 μs

SIFS: 16 μs 11 g_preamble: 20 μs

Symbol_time: 4 μs $$TCP\ Frame: 11g\_preamble + Symbol\_time \times roundup\left(\frac{MTU}{bits\_per\_symbol}\right)$$

Example: 20 μs+248 μs (if MTU=1536 bytes at 54M)

802.11 *PHY ACK*: 11g_preamble+

$$Symbol\_time \times roundup\left(\frac{14\ bytes\_of\_ACK}{bits\_per\_symbol}\right)$$

Example: 20 µs+4 µs

TCP ACK Frame: 11g_preamble+

$$\text{Symbol\_time} \times \text{roundup}\left(\frac{76\_\text{bytes\_of\_header}}{\text{bits\_per\_symbol}}\right)$$

Example: 20 µs+12 µs

Total=*DIFS*+Data Frame+*SIFS*+802.11 ACK+*DIFS*+
TCP ACK frame+*SIFS*+802.11 ACK Frame=34+
248+16+24+34+32+16+24=0.428 msec.

EXAMPLE 2

IEEE 802.11b @ 11 Mbps

DIFS: 50 µs
SIFS: 10 µs
11b_preamble: 192 µs (assuming a long preamble)

$$TCP\ \text{Frame: } 11b\_\text{preamble} + \frac{MTU}{\text{data\_rate}}$$

Example: 192 µs+1118 µs (if MTU=1536 bytes at 11M)

$$802.11\ PHY\ ACK: 11b\_\text{preamble} + \frac{14\_\text{bytes\_of\_ACK}}{\text{data\_rate}}$$

Example: 192 µs+11 µs $$TCP\ ACK\ \text{Frame: } 11b\_\text{preamble} + \frac{76\_\text{bytes\_of\_ACK}}{\text{data\_rate}}$$

Example: 192 µs+56 µs

Total TCP Frame=*DIFS*+Data Frame+*SIFS*+802.11
ACK+*DIFS*+TCP ACK Frame+*SIFS*+802.11
ACK Frame=50+1310+10+203+50+248+10+
203=2.084 msec.

As seen from the above calculations, the number of TCP transaction that can be completed within the WLAN time interval 82 may vary significantly depending on the network characteristics. The WLAN throughput for a given WLAN time interval may be calculated using the following equation.

$$WLAN\ \text{throughput} \frac{\text{Number\_of\_TCP\_Transactions} \times (MTU - \text{headers})}{\text{WLAN\_Interval}},$$

where MTU is the number of bytes within the WLAN frame payload.

In addition to maximizing the WLAN throughput, the number of back-to-back Bluetooth™ slots and the length of the WLAN interval should also be selected to provide enough throughput of the Bluetooth™ audio signal to satisfy the requirements of the audio buffer in the Bluetooth™ receiver. In addition to the number of back-to-back slots and the size of the WLAN interval, the Bluetooth™ throughput is also dependent on the packet size (e.g., 3-DH5, 3-DH3, etc.) and the slot packet format of the Bluetooth™ audio signal. The following equation may be used to determine the throughput for a Bluetooth™ A2DP audio signal with a standard 3-DH5 packet size and a 5+1 multi-slot packet format.

Bluetooth™ throughput:

$$\frac{\text{Number\_of\_slots} \times (\text{BT\_payload} - \text{BT\_headers})}{\text{Interval}},$$

where:

Number of slots is the number of back-to-back Bluetooth™ slots;

BT_payload is the number of payload bytes in the 5+1 multi-slot packet;

BT_headers is the number of header bytes in the 5+1 multi-slot packet;

Interval=Number of slots×(BT_5_1_slot)+Length of WLAN interval; and

BT_5_1_slot=6×625 µs.

Figure 6:
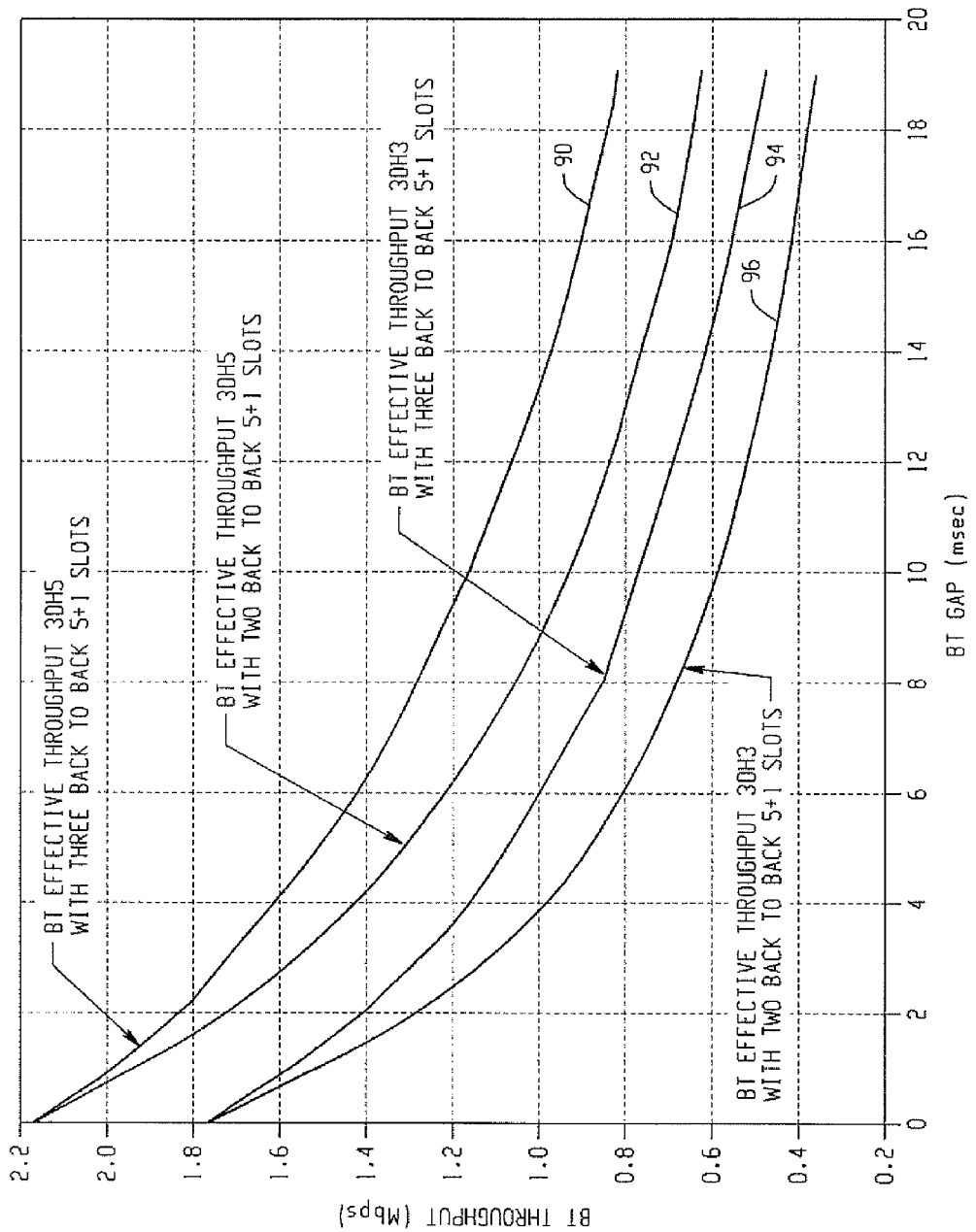
FIGS. 6 and 7 are graphs that may be used to select the size of a WLAN interval to provide a desired WLAN and Bluetooth™ throughput.
Figure 7:
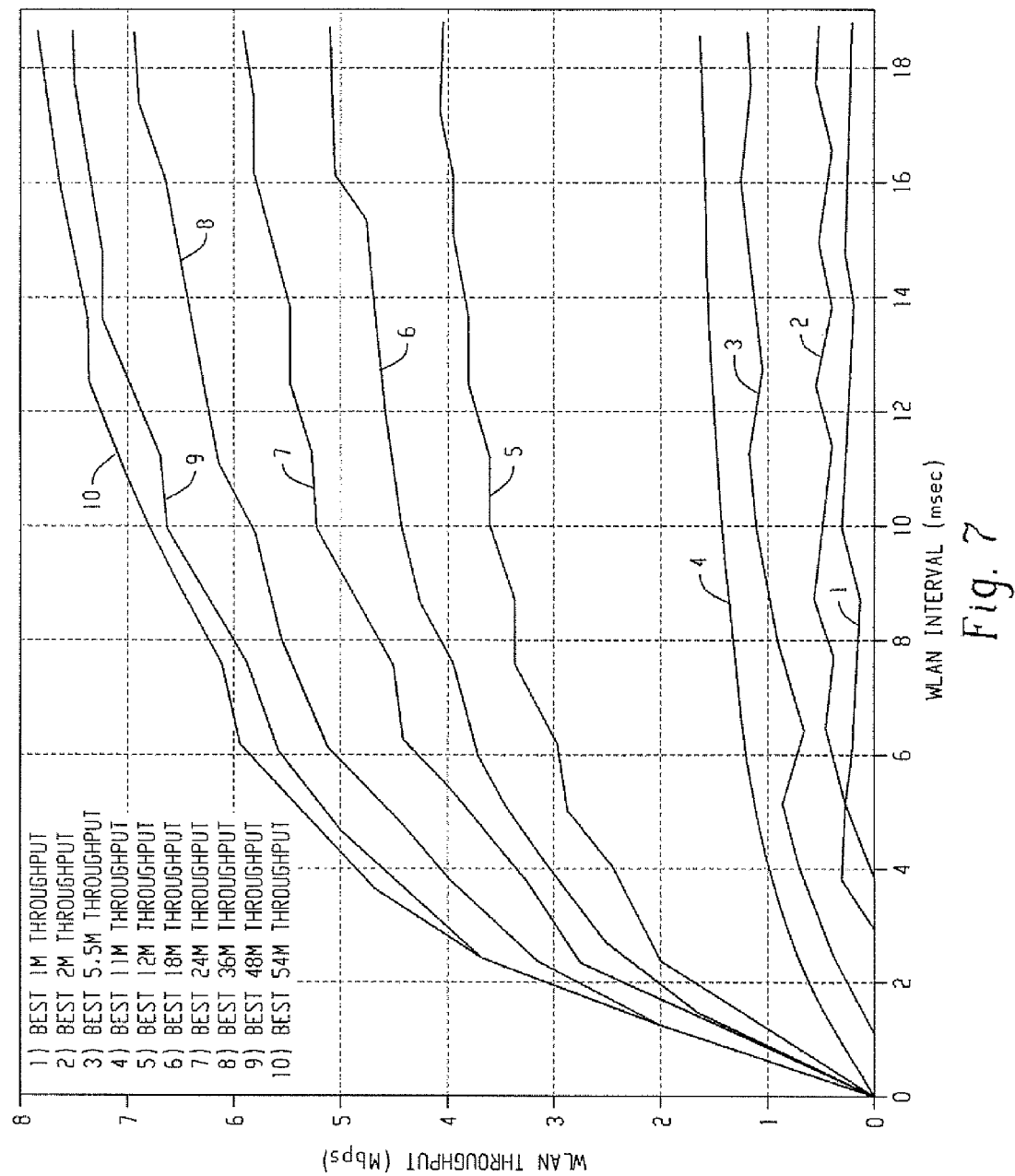

FIGS. 6 and 7 are graphs that may be used to select the size of the WLAN interval to provide a desired WLAN and Bluetooth™ throughput. FIG. 6 plots the Bluetooth™ throughput verses the WLAN interval size for two types of standard Bluetooth™ packets (3-DH5 and 3-DH3). FIG. 7 plots the WLAN throughput verses the WLAN interval size for various 802.11 data rates, assuming a 384 byte MTU. When determining the number of back-to-back Bluetooth™ slots and the size of the WLAN interval, the designer may use these graphs to balance the resultant Bluetooth™ throughput with the resultant WLAN throughput. In this way, the WLAN throughput may be maximized while maintaining a desired Bluetooth™ throughput. For example, in the case of a Bluetooth™ A2DP audio link, a throughput between 300 kbps and 800 kbps is typically needed.

With reference first to FIG. 6, the graph depicts a first curve 90 for a 3-DH5 Bluetooth™ packet and a second curve 92 for a 3-DH3 Bluetooth™ packet. The illustrated example shows that an 800 kbps throughput may be maintained for a 3-DH5 Bluetooth™ packet with a WLAN interval of approximately 12.5 msec. The graph shown in FIG. 7 may then be used to determine the WLAN throughput for a given WLAN interval. For instance, FIG. 7 shows that a WLAN interval of 12.5 msec should result in a maximum WLAN throughput of approximately 1.1 Mbps for an 802.11 WLAN with a 5.5 Mbps data rate. If this WLAN throughput is not sufficient, then a larger WLAN interval may be provided by sacrificing some amount of Bluetooth™ throughput. In this manner, a desired balance between the WLAN and Bluetooth™ throughputs may be achieved.

Figure 8A:
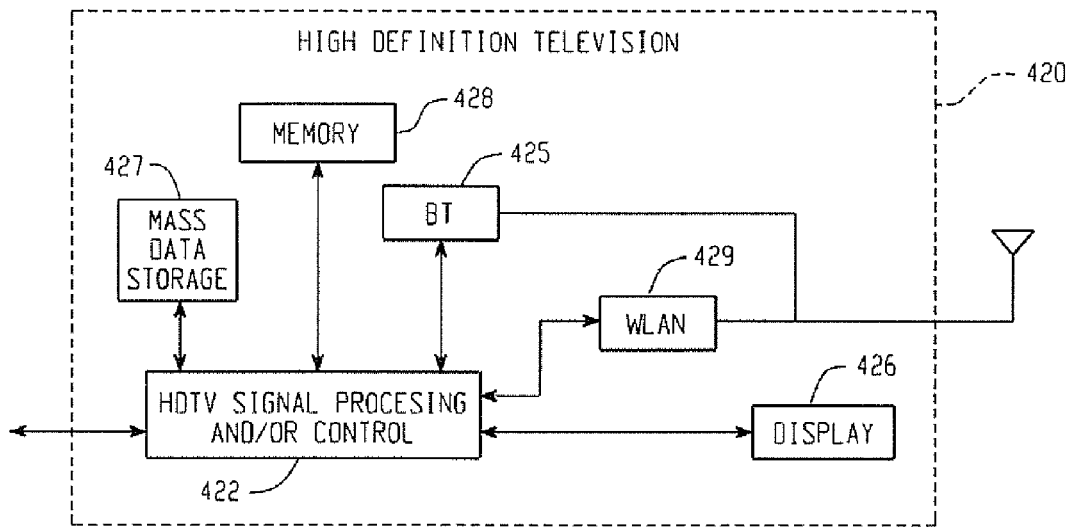
FIGS. 8A-8E illustrate various exemplary implementations of the present invention.

Referring now to FIGS. 8A-8E, various exemplary implementations of the present invention are shown. With reference to FIG. 8A, the present invention may be embodied in a high definition television (HDTV) 420. The present invention may implement either or both signal processing and/or control circuits, which are generally identified in FIG. 8A at 422, a WLAN interface 429, a Bluetooth™ interface 425 and/or mass data storage 427 of the HDTV 420. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. HDTV 420 may be connected to memory 428 such as RAM, ROM, low latency nonvolatile memory such as flash memory and/or other suitable electronic data storage. HDTV 420 also may support connections with a WLAN via a WLAN network interface 429 and may support Bluetooth™ communications via a Bluetooth™ interface 425.

Figure 8B:
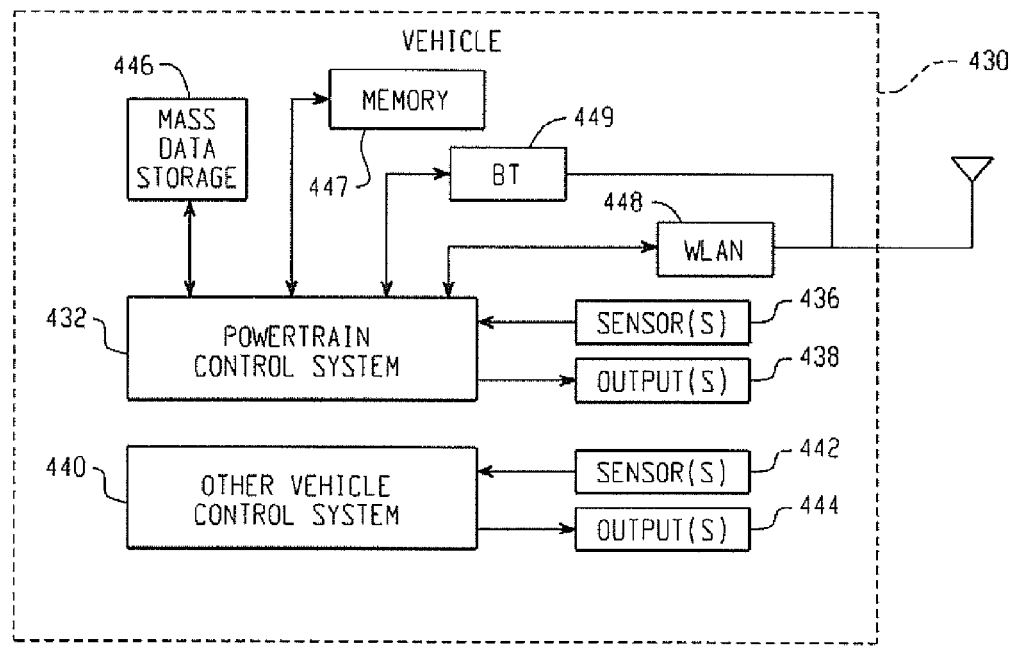

Referring now to FIG. 8B, the present invention implements a control system of a vehicle 430, a WLAN interface 448, a Bluetooth™ interface 449 and/or mass data storage 446 of the vehicle control system. Control system 440 may receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 and/or the other control systems 440 may communicate with mass data storage 446 that stores data in a nonvolatile manner. Mass data storage 446 may include optical and/or magnetic storage devices for example hard disk drives HDD and/or DVDs. The powertrain control system 432 and/or other control systems 440 may be connected to memory 447 such as RAM, ROM, low latency nonvolatile memory such as flash memory and/or other suitable electronic data storage. The powertrain control system 432 and/or other control systems 440 (e.g., the vehicle entertainment system) also may support connections with a WLAN via a WLAN network interface 448 and a Bluetooth™ interface 449.

Figure 8C:
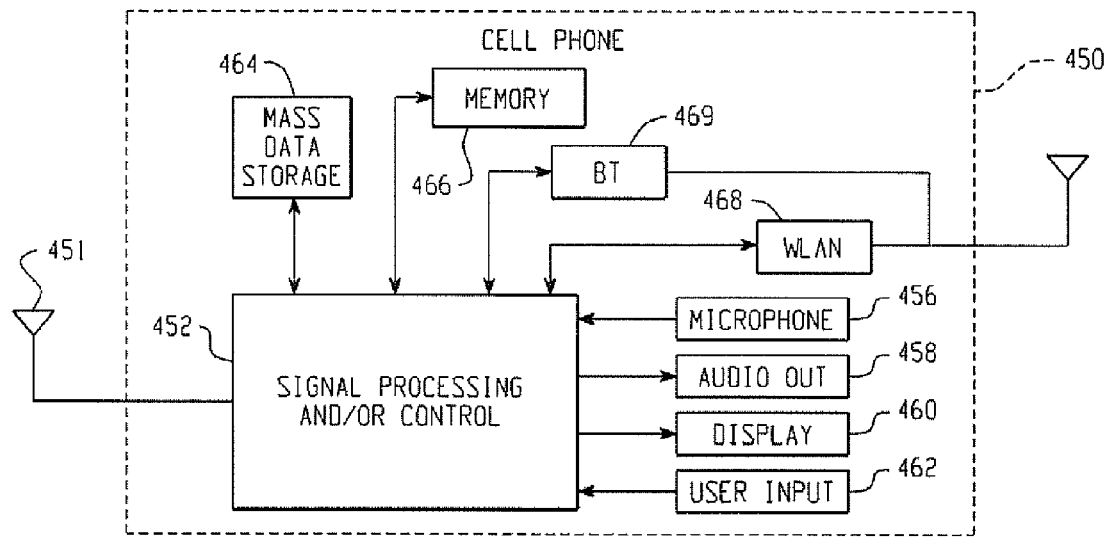

Referring now to FIG. 8C, the present invention may be embodied in a cellular phone 450 that may include a cellular antenna 451. The present invention may implement either or both signal processing and/or control circuits, which are generally identified in FIG. 8C at 452, a WLAN interface 468, a mass data storage 464 and/or a Bluetooth™ interface 469 of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468 and may support Bluetooth™ communications via a Bluetooth™ interface 469.

Figure 8D:
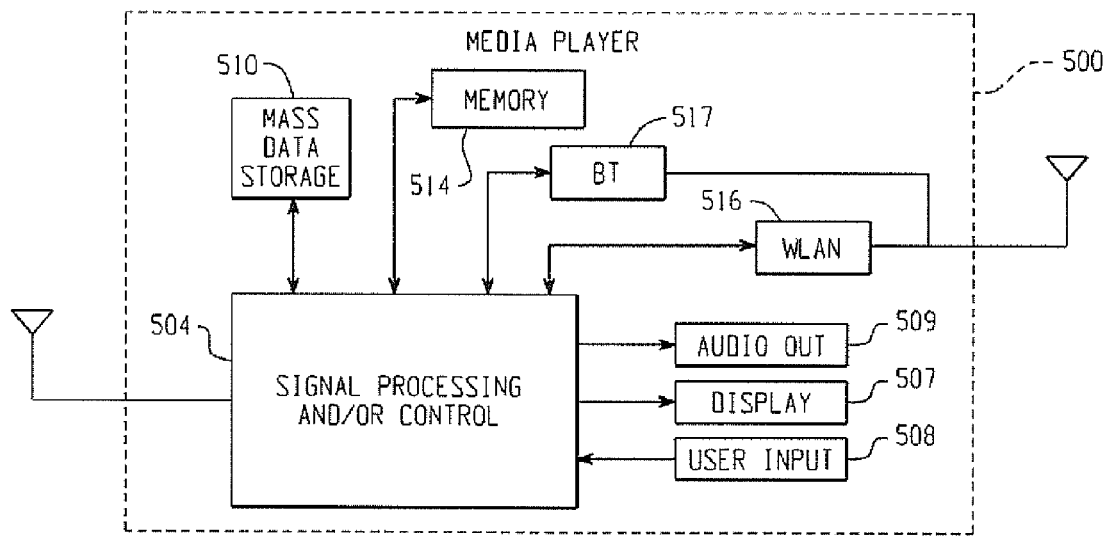

Referring now to FIG. 8D, the present invention may be embodied in a media player 500. The present invention may implement either or both signal processing and/or control circuits, which are generally identified in FIG. 8D at 504, a WLAN interface 516, a Bluetooth™ interface 517 and/or mass data storage 510 of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media player 500 may be connected to memory 514 such as RAM, ROM, low latency nonvolatile memory such as flash memory and/or other suitable electronic data storage. Media player 500 also may support connections with a WLAN via a WLAN network interface 516 and may support Bluetooth™ communications via a Bluetooth™ interface 517. Still other implementations in addition to those described above are contemplated.

Figure 8E:
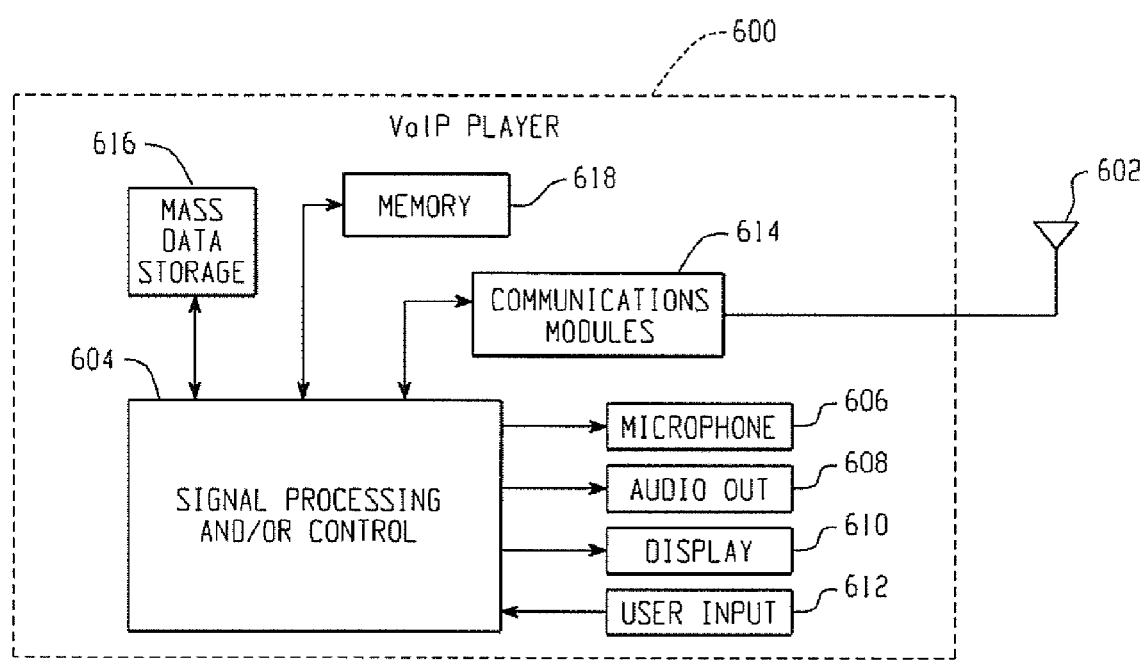

Referring to FIG. 8E, the present invention may be embodied in a Voice over Internet Protocol (VoIP) phone 600 that may include an antenna 602. The present invention may implement either or both signal processing and/or control circuits, which are generally identified in FIG. 8E at 604, a wireless interface and/or mass data storage of the VoIP phone 600. In some implementations, VoIP phone 600 includes, in part, a microphone 606, an audio output 608 such as a speaker and/or audio output jack, a display monitor 610, an input device 612 such as a keypad, pointing device, voice actuation and/or other input devices, and communication modules 614, such as a WLAN (WiFi) module and a Bluetooth™ module. Signal processing and/or control circuits 604 and/or other circuits (not shown) in VoIP phone 600 may process data, perform coding and/or encryption, perform calculations, format data and/or perform other VoIP phone functions.

VoIP phone 600 may communicate with mass data storage 616 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 600 may be connected to memory 618, which may be a RAM, ROM, low latency nonvolatile memory such as flash memory and/or other suitable electronic data storage. VoIP phone 600 is configured to establish communications link with a VoIP network (not shown) via a Wi-Fi communication module 614, and is also configured to provide Bluetooth™ communications via a Bluetooth™ communication module 614.

This written description uses examples to disclose the invention, including the best mode, and also to enable a person skilled in the art to make and use the invention. The patentable scope of the invention may include other examples that occur to those skilled in the art.

It is claimed:
1. A wireless communication system, comprising:
   first wireless communication circuitry to receive and transmit packets of a first type via an antenna;
   second wireless communication circuitry to receive and transmit packets of a second type via the antenna, wherein the packets of the second type are transmitted and received during time slots having a predefined length, and wherein the time slots are separated by time intervals during which no packets of the second type are transmitted or received by the second wireless communication circuitry; and an arbiter to control access of the first wireless communication circuitry and the second wireless communication circuitry to the antenna, wherein the arbiter causes the packets of the first type to be transmitted and received by the first wireless communication circuitry during the time intervals during which no packets of the second type are transmitted or received by the second wireless communication circuitry.

2. The wireless communication system of claim 1, wherein the predefined length of the time intervals is calculated to maximize a throughput of the packets of the first type and to maintain a predetermined throughput of the packets of the second type.

3. The wireless communication system of claim 1, further comprising:

front end connection and logic circuitry to respectively route packets of the first type and packets of the second type from the antenna to the first wireless communication circuitry and the second wireless communication circuitry.

4. The wireless communication circuitry of claim 1, wherein the first wireless communication circuitry and the second wireless communication circuitry operate in a same frequency band.

5. The wireless communication circuitry of claim 1, wherein the packets of the second type are transmitted using a preselected number of back-to-back time slots.

6. The wireless communication circuitry of claim 5, wherein the preselected number of back-to-back time slots is selected to maximize the throughput of the packets of the first type and to maintain the desired throughput of the packets of the second type.

7. A method of controlling access of first wireless communication circuitry and second wireless communication circuitry to a single antenna, the method comprising;

permitting the first wireless communication circuitry to access the single antenna and transmit or receive packets of a first type during time slots, wherein the time slots are separated by time intervals during which no packets of the first type are transmitted or received by the short range wireless communication circuitry, and wherein the time intervals have a predefined length; and permitting the second wireless communication circuitry to access the single antenna and transmit or receive packets of a second type during the time intervals during which no packets of the first type are transmitted or received by the first wireless communication circuitry.

8. The method of claim 7, wherein the predefined length of the time intervals is calculated to maximize a throughput of the packets of the second type and to maintain a predetermined throughput of the packets of the second type.

9. The method of claim 7, wherein the first wireless communication circuitry and the second wireless communication circuitry operate in the same frequency band.

10. A wireless communication system, comprising:

means for receiving and transmitting data packets via an antenna;

means for receiving and transmitting audio packets via the antenna, wherein the audio packets are transmitted and received during time slots having a predefined length, and wherein the time slots are separated by time intervals during which no audio packets are transmitted or received; and means for controlling access to the antenna by causing the data packets to be transmitted and received during the time intervals during which no audio packets are transmitted or received.

11. The wireless communication system of claim 10, wherein the predefined length of the time intervals is calculated to maximize a throughput of the data packets and to maintain a predetermined throughput of the audio packets.

12. The wireless communication circuitry of claim 10, wherein the audio packets are transmitted using a preselected number of back-to-back time slots.

13. The wireless communication circuitry of claim 12, wherein the preselected number of back-to-hack time slots is selected to maximize the throughput of the data packets and to maintain the desired throughput of the audio packets.

\* \* \* \* \*